United States Patent

Abarca et al.

[11] Patent Number: 6,133,188
[45] Date of Patent: Oct. 17, 2000

[54] PROCESS FOR PREPARING AN ETHYLENE POLYMERIZATION CATALYST AND ETHYLENE POLYMERIZATION PROCESS

[75] Inventors: Juan Raul Quijada Abarca, Porto Alegre; Dellyo Ricardo dos Santos Alvares, Botafogo, both of Brazil

[73] Assignees: Petroleo Brasileiro S.A. - Petrobras, Rio de Janeipo; Polialden Petroquimica S.A., Bahia, both of Brazil

[21] Appl. No.: 08/483,841

[22] Filed: Jun. 7, 1995

Related U.S. Application Data

[62] Division of application No. 08/358,607, Dec. 14, 1994, Pat. No. 6,018,006, which is a continuation of application No. 08/223,818, Apr. 6, 1994, abandoned, which is a continuation of application No. 08/139,868, Oct. 22, 1993, abandoned, which is a continuation of application No. 07/640,543, Jan. 14, 1991, abandoned, which is a continuation of application No. 07/226,906, Aug. 1, 1988, abandoned.

[30] Foreign Application Priority Data

Jul. 31, 1987 [BR] Brazil ..................................... 8703935
Mar. 29, 1988 [BR] Brazil ..................................... 8801441

[51] Int. Cl.[7] ....................................................... B01J 31/38
[52] U.S. Cl. ........................ 502/105; 502/107; 526/124.6
[58] Field of Search ..................................... 502/105, 107; 526/124.6

[56] References Cited

U.S. PATENT DOCUMENTS

| 4,069,169 | 1/1978 | Toyoda et al. | 526/906 |
| 4,143,223 | 3/1979 | Toyota et al. | 526/125 |
| 4,242,231 | 12/1980 | Ueno et al. | 526/125 |
| 4,314,911 | 2/1982 | Giannini et al. | 526/125 |
| 4,336,352 | 6/1982 | Sakurai et al. | 525/240 |

FOREIGN PATENT DOCUMENTS

| 830112 | 6/1975 | Belgium . |
| 8005302 | 7/1984 | Brazil . |
| 8005670 | 5/1985 | Brazil . |
| 2207931 | 6/1974 | France . |
| 1434264 | 5/1976 | United Kingdom . |

Primary Examiner—David W. Wu
Assistant Examiner—Ling-Siu Choi
Attorney, Agent, or Firm—Sughrue, Mion, Zinn, Macpeak & Seas, PLLC

[57] ABSTRACT

A preparation process for a catalytic support, based on a special alumina modified with varying quantities of magnesium chloride is described, a higher rate of $MgCl_2$ leading to a lesser quantity of heavy molecular chains in the final polymer. The support, prepared by milling the special alumina together with the $MgCl_2$ previously treated with ethyl benzoate, is impregnated with $TiCl_4$ in order to create the catalyst. The resulting catalysts show high activity, which enables the metallic residue and chloride eliminating stage to be avoided in the resin so created. Furthermore the types of molecular weight distribution and of mechanical properties are different for the polymers produced.

8 Claims, 1 Drawing Sheet

PROCESS FOR PREPARING AN ETHYLENE POLYMERIZATION CATALYST AND ETHYLENE POLYMERIZATION PROCESS

This is a divisional of application Ser. No. 08/358,607 filed on Dec. 14, 1994, now U.S. Pat. No. 6,018,006 which is a Continuation application of Ser. No. 08/223,818 filed on Apr. 6, 1994 now abandoned which is a Continuation application Ser. No. 08/139,868 now abandoned filed on Oct. 22, 1993 which is a Continuation application of Ser. No. 07/640,543 filed on Jan. 14, 1991, now abandoned which is a Continuation application of Ser. No. 07/226,906 filed on Aug. 1, 1988 now abandoned.

This invention concerns an improved process for preparing a catalytic support for ethylene polymerization and the ethylene polymerization process, the special characteristics of which arise out of said catalytic support. More specifically, the invention concerns the production of the alumina-magnesium chloride support, by milling together the two components, previously activated, thus imparting special activity characteristics to the support so provided, which will be made to react, in the usual way, with titanium tetrachloride and a co-catalyst, for example, triethyl aluminum. This invention further concerns the ethylene polymerization process the high activity of which and easily controlled molecular weight and distribution features are imparted by the new catalytic support disclosed herein.

Furthermore, this invention improves the Ziegler catalytic system characteristics disclosed under patent no. 8005670 of the applicant, said system being based on a high surface area and pore volume alumina (described in patent 8005302) which leads to a support that enables the polymerization of ethylene to take place at extremely high molecular weights. In this present invention the applicant has altered the support disclosed in patent no. 8005670 by mixing, in a ball, mill, such special alumina with varying quantities of magnesium chloride previously reacted with an electron donor, such as ethyl benzoate, so that, as the added quantity of magnesium halide varies, other components of the catalytic system being kept constant, the following changes take place in catalytic activity, in molecular weight and in the distribution of the molecular weight of the polyolefin product of the polymerization reaction, which is followed by variations in mechanical properties, such control being extremely useful and industrially desirable, while not yet fully described in specialized literature.

Furthermore, this application widens and improves the subject matter described in PI Application 8703935, which also concerns a Ziegler catalytic process.

The preparation of catalytic supports of alumina (or silica) and magnesium chloride is disclosed in several documents, the joining of the two support forming substances being achieved in different ways. Thus, DE patent 2.352.154 discloses the manufacture of a solid catalytic complex made up of a porous aluminum oxide of pore volume higher than 1.0 cm$^3$/g, a surface area of about 200–400 m$^2$/g, such aluminum oxide being halogenated to increase its activity, after which it is treated with $1.10^{-3}$ atom-mg of Mg per square meter of surface area of aluminum oxide, the Mg being in oxide or halide form and deposited as a suspension in an inert diluent, as a vapour or gas, in an aqueous solution or an organic solvent. After impregnation, the solvent is removed at a temperature below the decomposition temperature of the magnesium compound.

Belgian patent BE 830.112 refers to a catalytic system where a titanium-derived compound is finely dispersed over a substance provided with a high surface area, said substance having been previously treated with an inorganic magnesium compound, especially a Mg halide. In the process disclosed the halide is spread on the support (silica, silica-alumina, alumina, titanium or zirconium oxides), in an aqueous medium, the water is distilled off, and the support is activated by heating at 200–260° C. under reduced pressure. The resulting produce is refluxed in liquid TiCl$_4$, filtered, washed with a hydrocarbon, and dried under reduced pressure. The advantage claimed is good sensitivity to hydrogen (for a Mg/Ti ratio of 0.5 to 2.0 in the support), high polyethylene yield, no fines, and high apparent density. Mg content in support ranges form 1 to 5% preferably.

PI Patent 7309158 also describes a catalytic system where the halide or other Mg compound is impregnated on a calcination-activated alumina, and preferably, pre-halogenated. The amount of Mg compound varies between $10^{-4}$ and $10^{-1}$ miliatom-g of metal per square meter of the porous oxide surface area (measured by BET), the ideal surface area of the porous oxide being between 200 and 400 m$^2$/g. The impregnation method for the Mg compounds can be either by suspension in an inert diluent or in an aqueous solution or an organic solvent. After impregnation of the Mg compound, the solid secured is activated, the solvent being distilled off. In this patent the average molecular weight, as indicated by the Melt Flow Index (MFI) is controlled through the addition of molecular weight regulation agents, such as hydrogen. The Melt Flow Index increases as a function of the magnesium content in the catalytic complexes. It is claimed that the polyolefin produced have excellent properties in the extrusion and extrusion-blowing molding processes.

PI application no. 7905083 in turn describes the preparation of mixed alumina-magnesium chloride supports where alumina is impregnated with magnesium chloride at a rate of 5.75% by weight of the alumina, dissolved in an alcohol solution, the alcohol being evaporated after the impregnation. In Table 1 hereof figures are given to show that upon reducing the magnesium chloride content on the alumina and varying the quantity of titanium attached to the support, the plotting of yield and specific activity provides a Gauss-type curve, which parameters increase when the halide content rises from 0.5:1 alumina/halide to 9:1 of halide, and diminishes when the halide proportion present is as little as 19:1 to 49:1.

Like known processes this invention employs a solid catalytic support of alumina-magnesium chloride, the features peculiar to it arising from the fact that the alumina on which the halide is supported is the applicant's proprietary alumina, referred to in patent no. 8005302, the method for preparation of which imparts to it special activity characteristics, one of these being the exceptionally high volume of pores which together with a high surface area leads to polymers of heavy molecular weight, while other characteristics of the mixed support are brought about by the preparation process used for the solid alumina-magnesium chloride support, as will be disclosed below.

Thus, one object of this invention is to prepare a catalytic support and Ziegler type catalyst suitable to polymerize ethylene, along with molecular weight control and molecular weight distribution control, and a high proportion of heavy molecular chains. These characteristics are due to the different types of active sites created by the supports.

Another object of this invention is, by varying the content of magnesium in the support, to estimate with some degree of accuracy the end properties of the resulting polyethylenes, so as to obtain resins of completely controlled physical and mechanical properties.

Still another object is to reach a high catalytic activity rate without having to eliminate any metals or chloride form the polymer.

Actually, after the addition of the titanium component, the way of preparing the solid catalytic support of this invention leads to a catalytic system which enables not only a precise control to be kept over the MW and the MW distribution of the polymers produced but also certain polyethylene grades of a high rate of heavy MW chains to be made. As is well known by those skilled in the art, the two parameters: MWD and quantity of heavy MW chains bring about polymer properties, chiefly their mechanical properties.

Furthermore, in the system invented, MW and MWD are narrower rates than in the heretofore known systems, thus allowing for specific application thereof.

Therefore this is an invention whereby the method of preparing a catalytic support consists of the following stages:

A) Preparation of the support.
 a) Milling analytical grade magnesium chloride in a ball mill together with 10% by volume/weight of ethyl benzoate in an inert atmosphere, at room temperature, for about 48 hours.
 b) Calcining at 600–800° C., preferably 700–750° C., the special alumina—high surface area of about 200–500 $m^2/g$, and pore volume from 1.3 to 3.5 $cm^3/g$—for 4–8 hours, preferably 5 hours.
 c) Thorough mixing of activated alumina at b) with rates from zero to 100% by weight of the $MgCl_2$ prepared in a), blending to be done in a ball mill, at room temperature, for about two hours, in an inert atmosphere.

B) Preparation of Catalyst
 a) In order to impregnate the support made in a) prepare a suspension thereof in 5 to 7.5 times by volume/weight of $TiCl_4$ so that the final content of deposited Ti becomes 1.5 to 2.0%.
 b) wash surplus $TiCl_4$ off with n-hexane at 50° C.

DETAILED DESCRIPTION OF THE INVENTION

Figure 1:
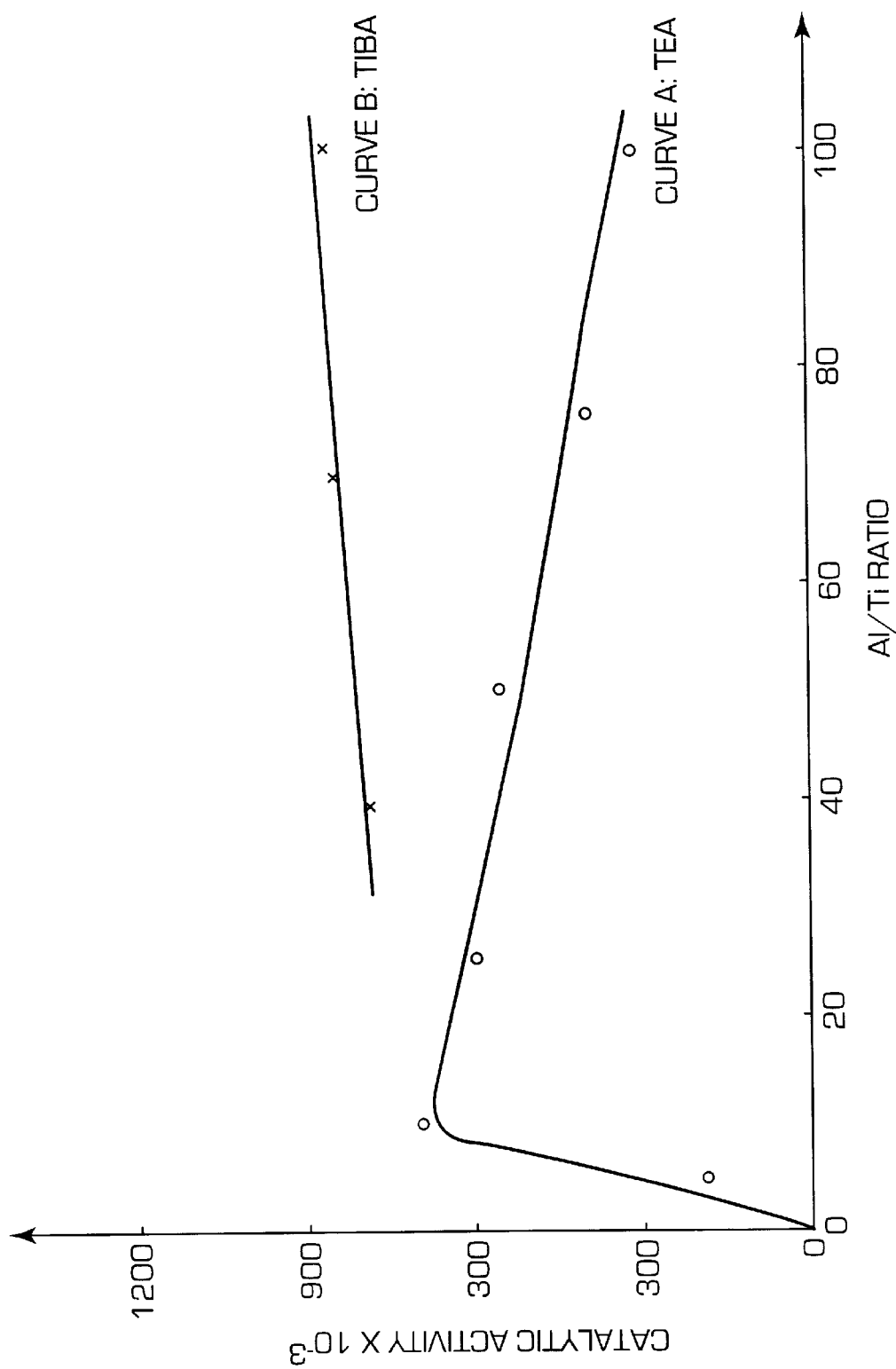
FIG. 1 shows the catalytic activity for various Al/Ti ratios in embodiments including either triisobutyl aluminum or triethyl aluminum.

The polymerization reaction to produce ethylene is carried out in a one gallon (3.78 liters) capacity Parr type reactor, with inert solvent, preferably n-hexane, with triethylaluminum or triisobutyl aluminum as co-catalyst, at an Al/Ti rate from 10/1 to 100/1 or 40/1 to 100/1 respectively. The pressure of the ethylene is kept constant at 6 $kgf/cm^2$, molecular weight being controlled by adding hydrogen at a pressure of 3 $kgf/cm^2$. Temperature is kept at 80–95° C. for one hours. Upon completion of the reaction, the reactor pressure is removed and a polymer is recovered as an n-hexane suspension. The resin is decanted and dried to a dry powder.

The following examples illustrate the intention but without limiting the scope thereof:

EXAMPLE 1 a) Preparing alumina 45 g of less than 200 mesh (0.074 mm) particle size dawsonite are calcined at 700° C. in an argon atmosphere for 5 hours. This thermal treatment provides 17 g of alumina with a surface area of 250 $m^2/g$ and pore volume of about 1.0 $cm^3/g$.

b) Preparing $MgCl_2$—BzOEt 7.0 g of $MgCl_2$ and 0.7 g of ethylbenzoate are placed in a ball mill, in an inert atmosphere. Activation of the $MgCl_2$ is achieved by milling this support in a mechanical vibrator for 48 hours.

c) Preparing support

Physical mixing of the two supports is achieved by milling 14.0 g of alumina together with 6.7 g of the $MgCl_2$ ethyl benzoate compound prepared in the previous step. This is done in a ball mill, in an inert atmosphere, for 2 hours.

d) Making catalyst 20 g of a physical mixture of $Al_2O_3$—$MgCl_2$ are placed in a glass flask provided with a magnetic stirrer and a reflux condenser. Then 150 ml of $TiCl_4$ are added, reaction being kept at constant temperature of 80° C., for 2 hours. After the reaction is finished the catalyst is washed several times with 1.5 liters of n-hexane at 50° C. The titanium content found experimentally in the catalyst was 1.7%.

e) Ethylene polymerization

In a reactor of 4 liters capacity 50 mg of catalyst and 1.35 ml of a 0.35M triethylaluminum solution to act as a co-catalyst are suspended in 2 liters of n-hexane. Thus, the molar ratio of Al/Ti was 50/1. The catalyst components are added at a temperature ranging between 30–50° C. Hydrogen is injected into the reactor at a pressure of 3 $kgf/cm^2$. Then ethylene is fed continuously during the reaction at a pressure of 6 $kgf/cm^2$. The polymerization reaction takes place at 85° C. over an hours.

480 g of polyethylene are produced, catalyst activity being 560,000 g Pe/gTih. The figures for activity, molecular weight and its distribution, as well as the physical and mechanical properties are shown in Tables 1 and 2 respectively.

EXAMPLE 2

Preparation stage for the different supports is the same as described in Example 1, rate of the physical mixture being varied in order to produce a 50–50% mixture of the components. Catalyst synthesis and polymerization stages were repeated. 420 g of polyethylene were produced, at a catalytic activity of 700,000 gPE/g with, other results being listed in Tables 1 and 2.

EXAMPLE 3

In this example only alumina was used as a support. Procedure to obtain catalyst and polymer is the same as described in example 1. Results are given in Tables 1 and 2.

EXAMPLE 4

In this example the support was MgCl alone, method of preparing catalyst and polymer having been a repetition of that in example 1. The results are shown in Tables 1 and 2.

EXAMPLES 5 AND 6

Mixtures with high contents of $Al_2O_3$ or $MgCl_2$ were also prepared. In the case of 15% $MgCl_2$, the results show a substantial increase in catalytic activity as compared with the catalyst of example 3. As regards mechanical properties (impact and tensile strength), seen to have dropped as compared with those of example 3, but even so they are still high.

In the case of the catalyst containing 85% $MgCl_2$, a great increase in catalytic activity was noticed, but mechanical properties dropped steeply. Results are given in Tables 1 and 2.

As is to be seen from Tables 1 and 2, the chief advantages of these new catalysts are the high catalytic activity reached and the possibility of controlling (tailoring) the molecular weight and its distribution, as well as the physical and mechanical properties.

An examination of Table 1 serves to show that for catalysts with a greater quantity of $MgCl_2$ in the support, catalytic activity will rise. As regards physical and mechanical properties the figures in Table 2 serve to show the effect of the type of catalytic system employed. Mechanical properties are greatly influenced by the molecular weight, varying in a manner directly proportional to molecular weight and its distribution. In Table 2 the results under examples 1 and 5 show that the polymers synthetized from catalysts containing less $MgCl_2$, and thus more alumina, have a higher molecular weight, and a MW distribution which has a higher rate of heavy molecular fractions, which means better mechanical properties. As the alumina in the support increases, mechanical properties will improve. Furthermore, the higher quantity of $MgCl_2$ in the catalysts, besides imparting higher rates of catalytic activity, lead to polymers that have greater melt flow and apparent density rates. The marked effect of the MW and of the MWD on the physical and mechanical properties of polymers should be pointed out.

Thus, thorough the use of the different catalytic systems one can select the different grades desired of polyethylene, within the range of existing applications, the latter being a function of the type of polymer produced.

EXAMPLES 7 TO 12

Using a catalyst containing 30% $MgCl_2$ in the support, method of preparing it being the same as described in Example 1, the effect of the aluminum/titanium mollar rates upon catalytic activity and the mechanical properties was studied. The co-catalyst employed in these examples was triethyl aluminum (TEA). The results are shown in table 3.

EXAMPLES 13 TO 17

In these examples triisobutyl aluminum (TIBA) was substituted for triethylaluminum; the same catalyst as that of examples 5 to 12 was employed, while polymerization procedure already referred to was followed. The effect of the alumina/titanium molar ratio upon the catalytic activity was checked, as well. Results are shown in table 4.

A study of tables 3 and 4, together with FIG. 1, serves to evaluate the behaviour of catalytic activity in terms of changes in Al/Ti molar ratios and of the nature of the co-catalyst used.

Changes in the aluminum/titanium ratio produce changes that are quite significant in the size of catalytic activity when triethyl aluminum is sued as a co-catalyst. Joint study of examples 7 to 12 serves to show that there is a maximum figure for the catalytic activity (example 8), which is the maximum point on Curve A in FIG. 1. Thus the quantity of triethyl aluminum had a decided effect upon the degree of activity of the final catalytic system produced.

As regards mechanical properties, the changes in the aluminum/titanium ratio do not affect them, nor do they significantly alter previous results.

As for examples 13 to 17, two distinct types of behaviour were noticed concerning changes in catalytic activity in terms of Al/Ti molar ratios. It was found that for Al/Ti ratios <10, no polymer resin could be produced, due to the extremely low degree of activity of the catalytic systems created. The other kind of behaviour noticed was that of the linearity displayed when the Al/Ti ratio was between 40 and 100 (curve B graph 1).

As in examples 7 to 12, there were no significant changes in mechanical properties in terms of changes in the Al/Ti ratios.

The results shown in tables 3 and 4 lead to the conclusion that the use of TIBA leads to higher figures for catalytic activity; however, polymers produced with use of TIBA for polymerization are morphologically much more irregular as compared to those obtained with triethyl aluminum.

TABLE 1

| EXAMPLE NO. | % MgC12 | % Ti | YIELD (g) | CATALYTIC ACTIVITY (g PE/g Ti h) |
|---|---|---|---|---|
| 3 | 0 | 2.0 | 340 | 150,000 |
| 5 | 35 | 1.4 | 320 | 450,000 |
| 1 | 30 | 1.7 | 480 | 560,000 |
| 2 | 50 | 1.2 | 420 | 700,000 |
| 6 | 85 | 1.4 | 700 | 1,425,000 |
| 4 | 100 | 1.3 | 685 | 1,496,000 |

TABLE 2

| | | MECHANICAL PROPERTIES | | | | Mw by G.P.C.* | | | | PHYSICAL PROPERTIES | |
|---|---|---|---|---|---|---|---|---|---|---|---|
| EXAMPLE NO. | % $MgCl_2$ | TENSILE STRENGTH (kgf/cm$^2$) | ELONGATION % | IMPACT STRENGTH (kg cm./cm.) | ROCKWELL HARDNESS | Mn 10$^3$ | Mw 10$^3$ | % FRACTIONS Mw ≧ 10$^5$ | % FRACTIONS 10 ≧ 10$^6$ | M.F.I (g/10 min) | App. DENSITY (g/cm$^{-3}$) |
| 3 | 0 | 430 | 400 | does not break | 72 | — | — | — | — | 0 | 0.21 |
| 5 | 15 | 360 | 830 | 80 | 73 | 34 | 270 | 55 | 6.5 | 0.10 | 0.21 |
| 1 | 30 | 300 | 850 | 65 | 73 | 33 | 254 | 47 | 6.5 | 0.16 | 0.24 |
| 2 | 50 | 255 | 900 | 50 | 73 | 24 | 193 | 39 | 4.5 | 0.26 | 0.24 |
| 6 | 85 | 225 | 900 | 35 | 73 | 24 | 185 | 36 | 3.8 | 0.30 | 0.26 |
| 4 | 100 | 200 | 1000 | 30 | 73 | 23 | 178 | 35 | 3.5 | 0.32 | 0.25 |

*G.P.C. = Gel Permeation Chromatography.

TABLE 3

| EXAMPLE NO. | Al/Ti RATIO | CATALYTIC ACTIVITY (g FE/g Ti h) | MECHANICAL PROPERTIES ||||
|---|---|---|---|---|---|---|
| | | | TENSILE STRENGTH (kgf/cm$^2$) | ELONGATION % | IMPACT STRENGTH (kg cm/cm) | ROCKWELL HARDNESS |
| 7  | 5   | 190,000 | *        | *        | *          | *      |
| 8  | 10  | 700,000 | 388 ± 12 | 964 ± 26 | 85.8 ± 3.2 | 83 ± 0 |
| 9  | 25  | 600,000 | 351 ± 32 | 968 ± 30 | 84.5 ± 1.6 | 81 ± 1 |
| 10 | 50  | 550,000 | 384 ± 12 | 964 ± 26 | 83.2 ± 3.0 | 80 ± 1 |
| 11 | 75  | 390,000 | 376 ± 18 | 932 ± 30 | 83.1 ± 1.6 | 81 ± 0 |
| 12 | 100 | 360,000 | 364 ± 14 | 980 ± 0  | 73.4 ± 2.0 | 81 ± 1 |

Note: Support - at 30% MgCl$_2$ 70% alumina mixtures; co-cat: TEA
*The mechanical properties data for example 7 could not be determined because of a lack of polymer at Al/Ti = 5

TABLE 4

| EXAMPLE NO. | Al/Ti RATIO | CATALYTIC ACTIVITY (g FE/g Ti h) | MECHANICAL PROPERTIES ||||
|---|---|---|---|---|---|---|
| | | | TENSILE STRENGTH (kgf/cm$^2$) | ELONGATION % | IMPACT STRENGTH (kg cm/cm) | ROCKWELL HARDNESS (R) |
| 13 | 5   | *       | *        | *        | *          | *      |
| 14 | 10  | *       | *        | *        | *          | *      |
| 15 | 40  | 795,000 | 338 ± 15 | 896 ± 22 | 95.1 ± 2.7 | 77 ± 0 |
| 16 | 70  | 850,000 | 367 ± 13 | 880 ± 0  | 93.8 ± 2.3 | 77 ± 1 |
| 17 | 100 | 875,000 | 351 ± 15 | 857 ± 18 | 91.3 ± 2.1 | 79 ± 1 |

NOTE: Support - MgCl$_2$/Alumina 30/70 (% by weight): co-cat: TIBA
*For examples 13 and 14 the data for catalytic activity and mechanical properties could not be determined because no polymerization occurred in such range of aluminum-titanium ratio.

What is claimed is:

1. A process for preparing an ethylene polymerization catalyst at low pressure, whereby the following stages take place:
   (a) milling analytical grade magnesium chloride in a ball mill with 10% by weight of ethyl benzoate based on the total weight of magnesium chloride, in an inert atmosphere, at room temperature, for about 48 hours, up to suppression of the 2.56 A peak in the X-ray spectrum;
   (b) calcining at 600–800° C. for 4–8 hours dawsonite so as to prepare an activated alumina having a surface area of about 200–500 m$^2$/g, and a pore volume between 1.0 and 3.5 cm$^3$/g;
   (c) thorough mixing of the activated alumina of b) in an amount ranging from 15 to 85% by weight of the MgCl$_2$ prepared in a) based on the total weight of the activated alumina, the mixing being done in a ball mill at room temperature, for at least two hours, in an inert atmosphere to prepare a support;
   (d) impregnating the support prepared in c) with 5 to 7.5 times by weight of titanium tetrachloride in an inert atmosphere and stirring for two hours at 80° C., so as to deposit from 1.3 to 2.0% by weight of titanium based on the total weight of the catalyst; and
   (e) washing the surplus TiCl$_4$ off with n-hexane at 50° C.

2. A process as in claim 1, whereby the activity of the catalyst prepared is between 150,000 and 1,465,000 grams of polyethylene per gram of titanium per hours.

3. A process as in claim 1, whereby the activity of the catalyst prepared is between 150,000 to 1,496,000 grams of polyethylene per gram of titanium per hour.

4. A process as in claim 1, wherein the pore volume is between 1.3 and 3.5 cm$^3$/g.

5. A process for preparing the ethylene polymerization catalyst at low pressure, consisting of:
   (a) milling analytical grade magnesium chloride in a ball mill with 10% by weight of ethyl benzoate based on the total weight of magnesium chloride, in an inert atmosphere, at room temperature, for about 48 hours, up to suppression of the 2.56 A peak in the X-ray spectrum;
   (b) calcining at 600–800° C. for 4–8 hours dawsonite so as to prepare an activated alumina having a surface area of about 200–500 m$^2$/g, and a pore volume between 1.0 and 3.5 cm$^3$/g;
   (c) thorough mixing of the activated alumina of b) in an amount ranging from 15 to 85% by weight of the MgCl$_2$ prepared in a) based on the total weight of the activated alumina, the mixing being done in a ball mill at room temperature, for at least two hours, in an inert atmosphere to prepare a support;
   (d) impregnating the support prepared in c) with 5 to 7.5 times by weight of titanium tetrachloride in an inert atmosphere and stirring for two hours at 80° C., so as to deposit from 1.3 to 2.0% by weight of titanium based on the total weight of the catalyst; and
   (e) washing the surplus TiCl$_4$ off with n-hexane at 50° C.

6. A process as in claim 5, whereby the activity of the catalyst prepared is between 150,000 and 1,465,000 grams of polyethylene per gram of titanium per hour.

7. A process as in claim 5, whereby the activity of the catalyst prepared is between 150,000 and 1,496,000 grams of polyethylene per gram of titanium per hour.

8. A process as in claim 5 wherein the pore volume is between 1.3 and 3.5 cm$^3$/g.

* * * * *